United States Patent [19]

Wallace et al.

[11] Patent Number: 4,962,377
[45] Date of Patent: Oct. 9, 1990

[54] PAGING BY TEXT MATCHING

[75] Inventors: Craig S. Wallace; Robert L. Breeden, both of Boynton Beach, Fla.

[73] Assignee: Motorola, Inc., Schaumburg, Ill.

[21] Appl. No.: 308,281

[22] Filed: Feb. 9, 1989

[51] Int. Cl.5 .............................................. H04B 1/00
[52] U.S. Cl. ...................... 340/825.440; 340/825.360; 340/524; 340/539
[58] Field of Search ............... 340/524, 531, 534, 536, 340/539, 825.36, 825.37, 825.44, 311.1; 379/40, 49, 51, 103, 57

[56] References Cited

U.S. PATENT DOCUMENTS

| | | | |
|---|---|---|---|
| 4,336,524 | 6/1982 | Levine | 340/311.1 |
| 4,692,742 | 9/1987 | Raizien et al. | 379/51 |
| 4,814,763 | 3/1989 | Nelson et al. | 340/825.44 |
| 4,856,047 | 8/1989 | Saunders | 379/40 |

Primary Examiner—Donald J. Yusko
Assistant Examiner—Dervis Magistre
Attorney, Agent, or Firm—William E. Zitelli; Vincent B. Ingrassia

[57] ABSTRACT

A selective call system is provided in which string searching or text matching operations are performed on data from data generating devices such as condition sensors in a security system. When a predetermined string is identified, an address of a selective call receiver such as a pager is generated and that receiver is called. The invention is applicable to other applications where data is generated which includes predetermined character strings.

8 Claims, 7 Drawing Sheets

PAGING BY TEXT MATCHING

BACKGROUND OF THE INVENTION

This invention relates generally to the field of selective call systems, such as pager systems, and to the field of monitoring of equipment and/or buildings, such as in security systems, fire alarm systems, automated process control, computer equipment monitoring and other such fields in which equipment is employed which generates data in the form of character strings. Such fields would include generation of information such as financial services information, weather information or the like.

DESCRIPTION OF THE PRIOR ART

In existing installations, it is known to have a number of condition sensors distributed about a building, with these sensors feeding a central control terminal having an output device, typically a monitoring screen and a printer, which is monitored by a security guard. The condition sensors generate messages which appear on the monitor screen. Such messages might be "fire in building two" or "gate three open", or the like. It is a problem with such an arrangement that the security guard must remain close to the screen and must keep a continuous watch of the screen in order to ensure that important messages are not missed.

Systems have been devised in which the condition sensors generate a dedicated message, typically characterized by an address, which is recognized by a centrally located computer, the computer initiating the transmission of a paging message to a paging receiver.

One such system is that made by Computer X, Inc. and Motorola C & E Inc. using the Computer X single virtual machine (cXSDM trademark) such a system can be used for factory floor control, communicating events and status directly to maintenance, engineering, quality, management, personnel, avoiding the need for operators whose main function is merely monitoring the system and alerting personnel to events and/or problems. At each condition sensor location there is a cell controller which carries out various functions associated with that location and may include displaying or generating of condition messages. The cell controllers are all connected to a common bus, and a further cell controller, having a paging transmitter, is connected to the bus. Each of the condition sensor controllers is programmed to generate a signal when particular conditions are sensed and that signal is recognized by the paging transmitter cell controller as being intended for that cell controller, whereupon a paging message is transmitted to an appropriate pager according to the coded message received from the condition sensor cell controller.

A further system is described in U.S. Pat. No. 4,692,742 of Raizen et al, in which a plurality of locations are monitored by sensors which transmit alarm signals to a central control station by radio or telephone, each alarm being encoded to identify a particular sensor location and alarm condition. A computer at the control station actuates a radio or telephone transmitter to transmit signals notifying an appropriate one of a plurality of satellite stations, such as paging receivers, of the particular alarm condition.

Each of the above systems has the disadvantage that some sort of programming is necessary at the condition sensor location, so that the necessary coded message is transmitted to the control station, for the control station to receive that message and act upon it. This means that a substantial programming effort is necessary to set up the system, especially where there are a large number of individual condition sensor locations, or where the different devices sensing various conditions differ. Thus, for example the condition sensors may include equipment manufactured by different manufacturers, operating on different programming languages and using different interfaces. It is not always possible to ensure that all the condition sensing devices are the same. For example, the Computer X system is intended as a system to be designed and built as a whole, in which each of the cell controllers is identical. It would be desirable to design a system into which existing equipment could be incorporated, without the need to introduce additional programming to the existing equipment. In this way, the equipment that could be monitored is extremely wide, and could include dedicated condition sensors, monitoring terminals, printers, personal computers, photocopying machines and indeed any equipment that generates data in the form of character strings.

SUMMARY OF THE INVENTION

This invention provides a selective call system comprising: means for receiving data including predetermined strings of characters; means for monitoring data received, said means including string searching means; control means responsive to the string searching means for selectively generating an address of a selective call receiver when a predetermined string is identified; and transmitting means responsive to the control means for calling the selective call receiver identified by that address.

The data may be generated by any data generating means capable of generating data including predetermined strings of characters.

In a preferred embodiment of the invention predetermined text/messages is/are stored and selected for transmission to the selected call receiver, the text or message selected being dependent on the predetermined string identified.

In one specific embodiment of the invention, means are provided for reading data in the form of text containing the predetermined string (from a data bus) and for transmitting the text to the selective call receiver. As a further feature, means for storing predetermined text may be provided, and selector means for selecting additional text for transmission to the selective call receiver together with said text, the additional text selected being dependent on the predetermined string identified.

In a further specific embodiment, means are provided for reading numerical data from the data bus and for calculating the address to which a message is to be sent, by performing a predetermined algorithm on the numerical data read.

A preferred embodiment of the invention will now be described, by way of example, with reference to the accompanying drawings.

DETAILED DESCRIPTION OF A PREFERRED EMBODIMENT

As an example of an embodiment of the invention, the invention will be described in the form of a condition monitoring system for monitoring a number of items of equipment, and employing a paging transmitter as transmitting means, and a paging receiver as a selective call receiver.

Figure 1:
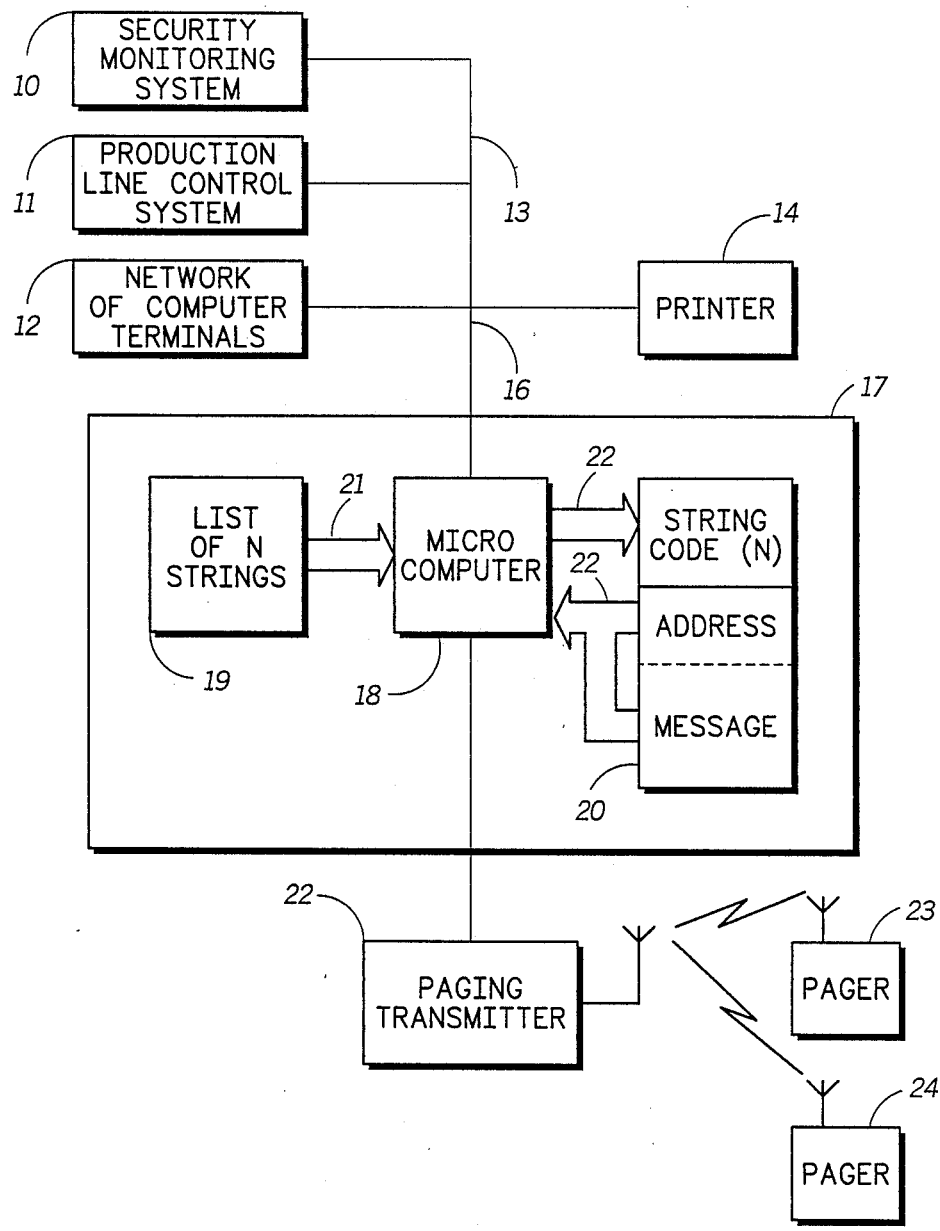
FIG. 1 illustrates a selective call system according to the present invention.

Referring to FIG. 1 there are shown three input devices in the form of a security monitoring system 10, a production line control system 11 and a local area network of computer terminals 12. Each of these devices/systems is connected to a common data bus 13. Also connected to the data bus 13 is a printer 14, with an associated video monitor (not shown).

In normal use, each of the devices/systems 10, 11 and 12 is arranged to send messages to the printer 14 via the bus 13, and a member of personnel will monitor the printer 14 and its video monitor to ensure smooth running of each of the devices/systems 10, 11 and 12. Each of the input devices will be arranged to output its own individual messages, depending on the function of that device. Thus, for example, the security system 10 may be arranged to output messages such as "fire in building 2", "gate 3 open" and the like. Similarly, system 11 will be arranged to output messages such as "power failure in line 2", "sensor 15 faulty", or the like. In the same manner, local area network 12 may be arranged to output to the printer 14 messages such as "incorrect security code entered on terminal 3", "terminal 4 not receiving characters" or the like. In addition to sending messages to the printer 14, the devices 10, 11 and 12 may be arranged to send messages to each other. Thus, a particular piece of apparatus in the production line being monitored by control system 11 may be arranged to send a message to a particular terminal in the network of terminals 12, such as the terminal of the technician responsible for that piece of equipment. This may be a message which is not read by printer 14.

Connected to data bus 13 is a port 16, leading to a paging terminal 17. Alternative to there being a single data bus between all the items 10, 11, 12, 14 and 17, and a single port to the terminal 17, there may instead be different connections, e.g. items 11, 12 and 14 may be connected via an RS232 interface, while system 10 is not connected to any of the devices 11, 12 and 14, but is connected to terminal 17 via a Centronics-type interface.

In all the above cases, the net effect is that the terminal 17 is capable of receiving any characters that the devices 10, 11, 12 and indeed 14, are capable of providing.

Terminal 17 comprises a microcomputer 18, memories 19 and 20, data buses 21 and 22 and other components not shown. The micro computer 18 is connected to a paging transmitter 22 which is in communication with paging receivers 23 and 24.

The operation of the terminal 17 is as follows. Microcomputer 18 reads characters from the data bus 13 via port 16, as they are output one-by-one on the data bus 13 by the devices 10, 11, 12 and 14. It will be understood that any data present on bus 13 is presented to port 16. It is not necessary to address the data to that port.

Microcomputer 18 stores a sequence of a predetermined number of characters, say 24 characters, representing the maximum string that can be searched. Microcomputer 18 reads pre-programmed strings from a list of strings in memory 19, and compares these strings with the strings of 24 characters received from port 16. If there is no match between the string received and any of the strings stored, no further action is taken until the next character is received by port 16. Upon receipt of a new character, this is added to the string of characters stored in microcomputer 18, all the characters therein are shifted along, and the earliest character to have been received is discarded. The comparison operation with the list of strings in the memory 19 is then repeated. These operations are shown in the flow diagram of FIG. 2.

Figure 2:
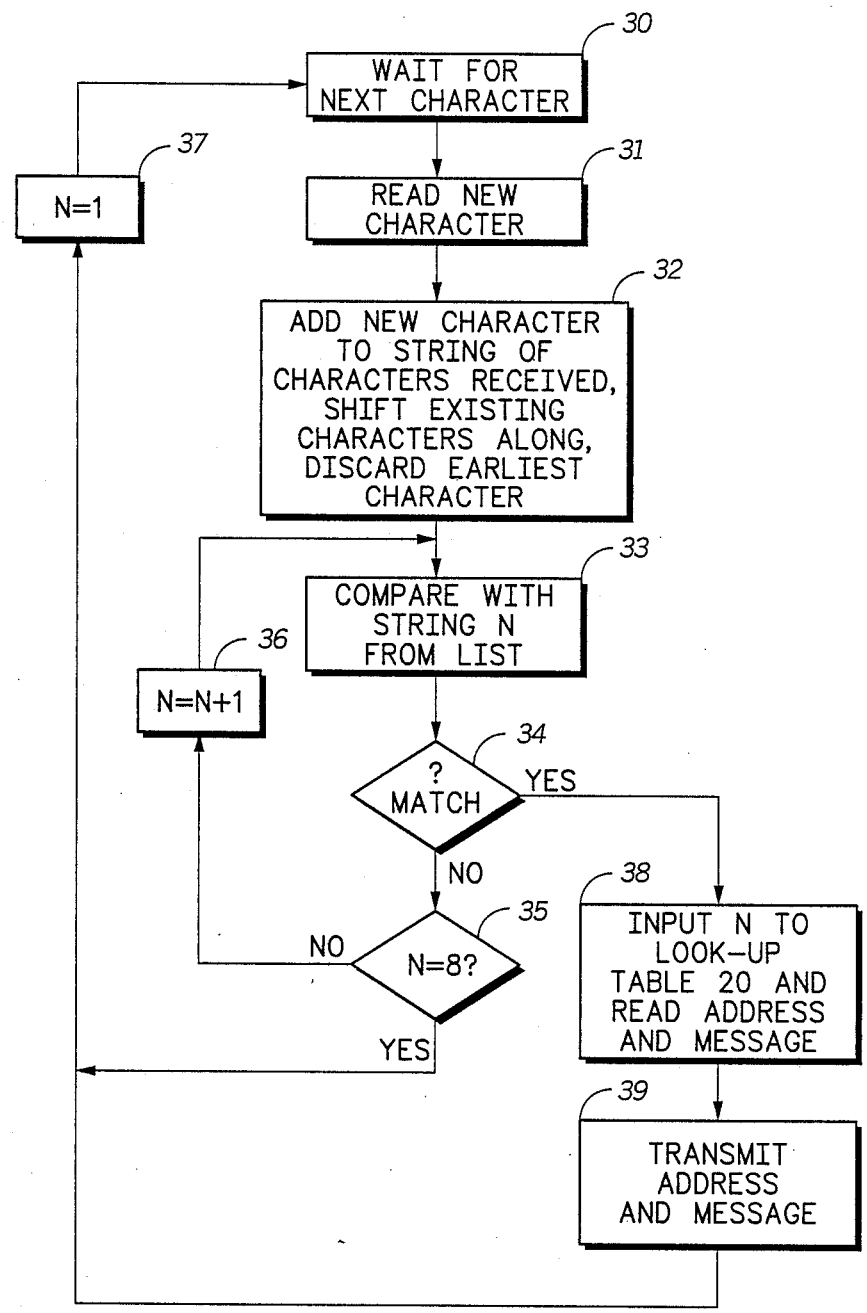
FIG. 2 is a flow chart showing the overall operation of an embodiment of the invention.

In FIG. 2, the example is taken where there are eight strings in memory 19, which the terminal is searching for and to which the terminal will respond. A string code register stores a string code N identifying that string. N is a number from 1 to 8. The flow diagram begins with a wait instruction 30, at which microcomputer 18 waits for the next character to be presented to port 16. At step 31, the new character is read, and at step 32 the existing received characters are shifted by one position, the earliest character is discarded, and the new character is added to the string for comparison. At step 34, the string of characters so received is compared with string N from the list in memory 19. Initially, N=1. If there is no match, this is detected by step 34, and the program proceeds to step 35. This step tests whether all the strings in the list have been compared. In this case, only the first string has so far been compared and the program proceeds to step 36, where N is incremented. The next string from the list is then compared in step 33, and so on until either a match is detected or all the strings have been compared. In the latter case, the program proceeds to step 37, where N is reset to 1, and then at step 30 the program waits for the next characters. If a match is detected at step 34, microcomputer 18 performs a look-up operation in the table of memory 20, by inputting the string code N, and reading the address and the message which are pre-programmed to correspond to that code (step 38). Finally, in step 39, this address and message are transmitted. The paging receiver 23 or 24 corresponding to that address will react to receipt of that address by displaying the message, emitting an alarm signal, or performing other functions, as is known in the art.

Further details of the match operation of step 34 will now be described. By way of example, it will be assumed that the data presented on data bus 13 takes the form of lines of text, each line terminating in a particular character (usually a carriage-return character). As is known in existing string search algorithms, the use of "wild card" (or instructional) characters "?" and "*" may be used to mean "any character" and "any number of any characters", respectively.

Examples will now be given of possible strings and string search operations.

Figure 3:
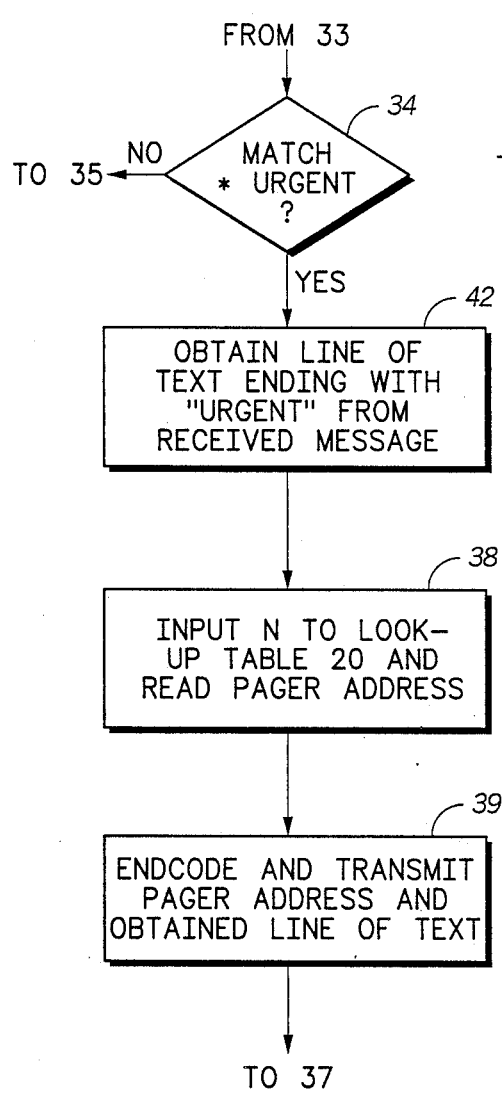
FIGS. 3–9 are additional flow charts complementing the flow chart of FIG. 2 showing additional features of the overall operation of an embodiment of the invention.

EXAMPLE 1 (refer to FIG. 3)

Triggering Text String: *URGENT

This triggering text string will cause (block 34) a page to be sent (blocks 38 and 39) for any line of text which ends with the string "urgent" (block 40).

Figure 4:
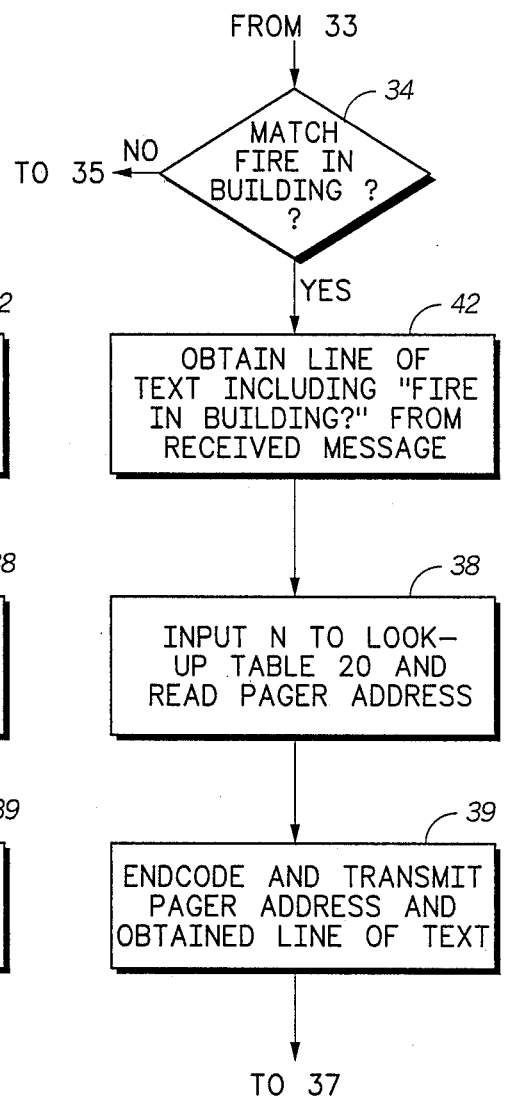

EXAMPLE 2 (refer to FIG. 4)

Triggering Text String: FIRE IN BUILDING?

This triggering text string will cause (block 34) a page to be sent (blocks 38 and 39) for each line matching gate string, where ? may be any character (block 42).

EXAMPLE 3

Triggering Text String: *

This triggering text string will send a page for every line, regardless of its contents.

For each of the above triggering text strings, there is a pager number stored in memory, identifying the pager to be paged. In the following further examples, there are shown methods by which the pager number can be determined as a function of the characters received.

Variable pager numbers are programmed by specifying a fixed "starting number" and a "+" character. When the paging terminal encounters "+", it will add to the starting number the value of all characters associated with the first "wild card" string of the triggering text string. (Where a "wild card" string contains letters instead of digits, numerical values will be assigned; i.e., A=1, B=2, etc.).

Figure 5:
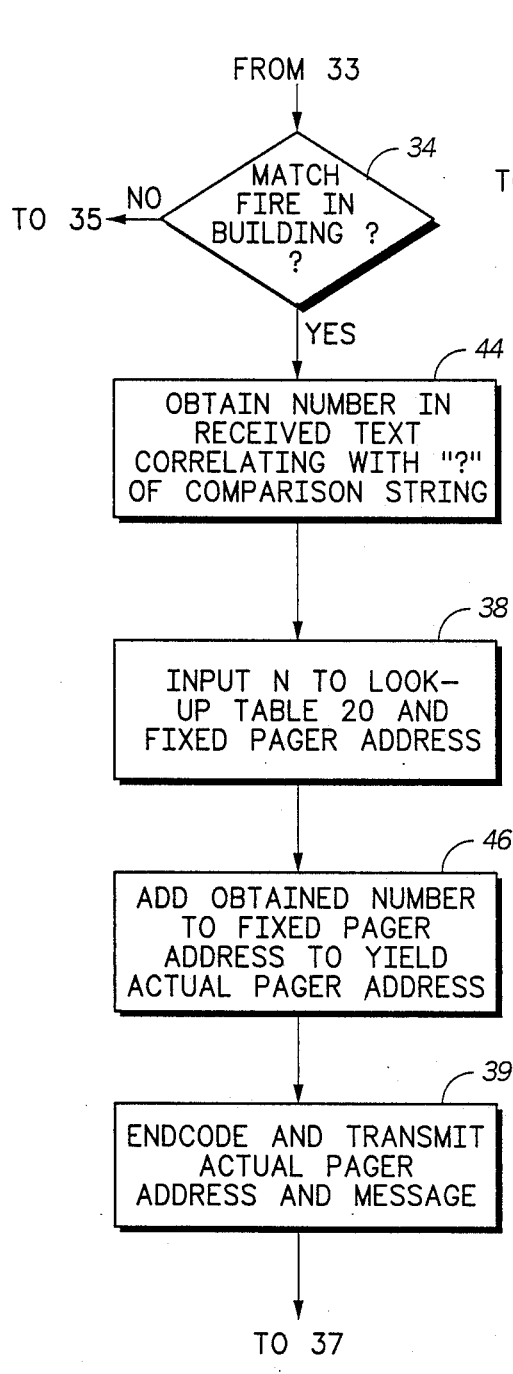

EXAMPLE 4 (refer to FIG. 5)

Triggering Text String: FIRE IN BUILDING ?
Pager number : 120+

This pager number will cause (block 34) pager number 120 (block 38) plus (block 46) the value of ? (block 44) to be paged (block 39), e.g. if ? matches the character "3" in the actual message line, then pager number 123 will be paged.

EXAMPLE 5

Triggering Text String: GATE * OPEN.
Pager number: 54+

This pager number will cause page number 54 plus the value of * to be paged, e.g. if * matches the string 23 in the actual message line, then pager number 77 will be paged (54+23).

For unusual cases where there may be more than one "wild card" character used in the triggering text string, a variable pager number may be entered as "starting number" plus n, where n signifies that the nth wild card occurrence is to be used.

Figure 6:
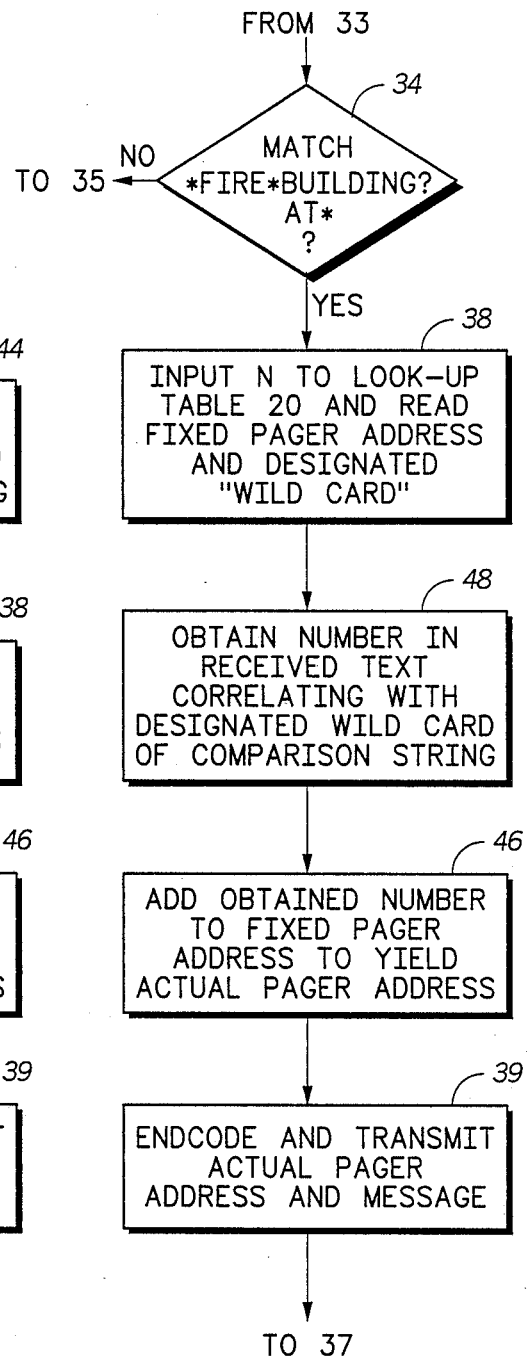

EXAMPLE 6 (refer to FIG. 6)

Triggering Text String:
* FIRE * BUILDING ? AT *
Pager number: 120+3

This pager number will cause (block 34) pager number 120 (block 38) plus (block 46) the value of ? (block 48), the third "wild card" to be paged (block 39).

Display Data programming may be accomplished by specifying both fixed data and variable data to be determined from the line of input text which triggers the page. This feature works similarly to the programming of variable digits in the pager number, i.e., through "wild card" values, except that letters will not be converted to numbers.

Figure 7:
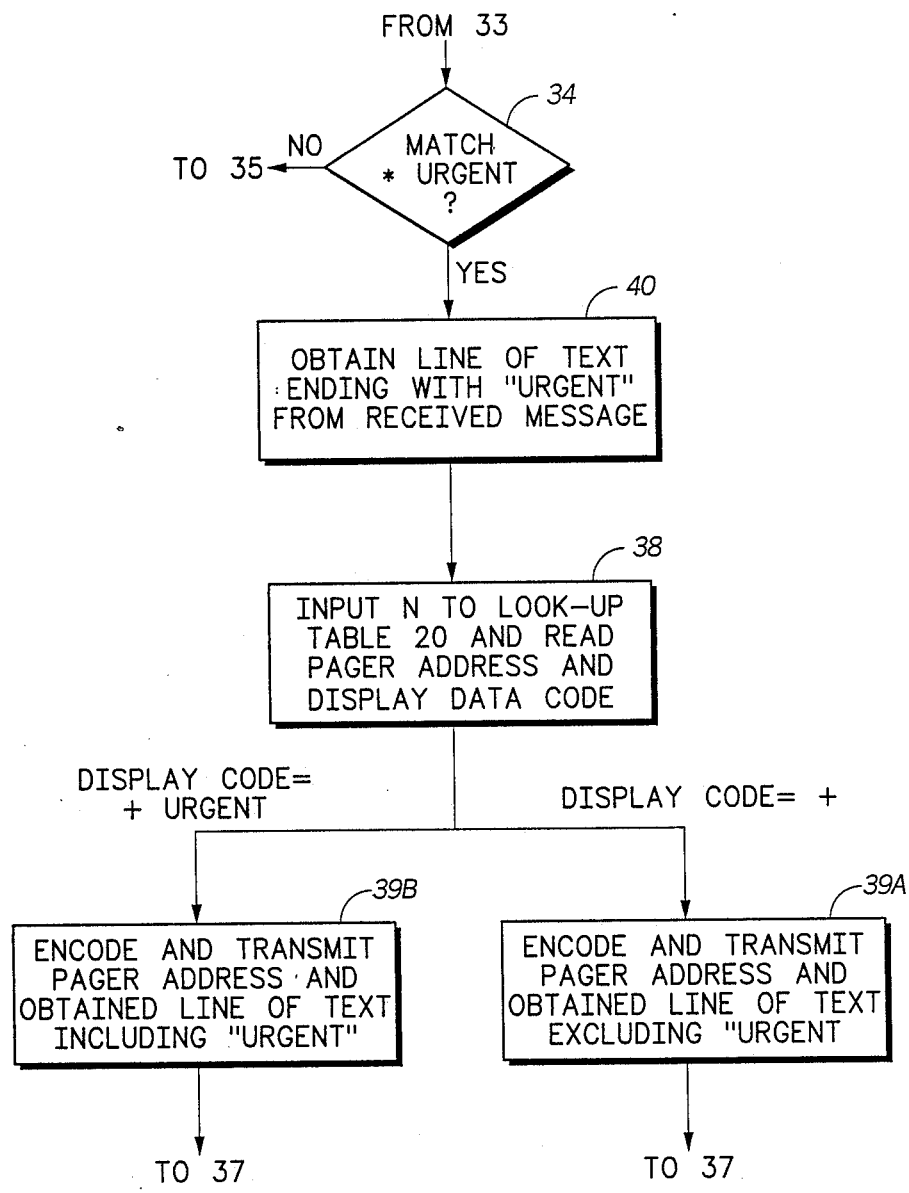

EXAMPLE 7 (refer to FIG. 7)

Triggering Text String: * URGENT (block 34)
Display Data: + (block 38) This Display Data will send (block 39a) all characters of the matching line of input, except for the word "URGENT".

EXAMPLE 8 (refer to FIG. 7)

Triggering Text String: * URGENT (block 34)
Display Data: + URGENT (block 38)

This Display Data will send (block 39b) all characters of the matching line, plus the word "URGENT".

Figure 8:
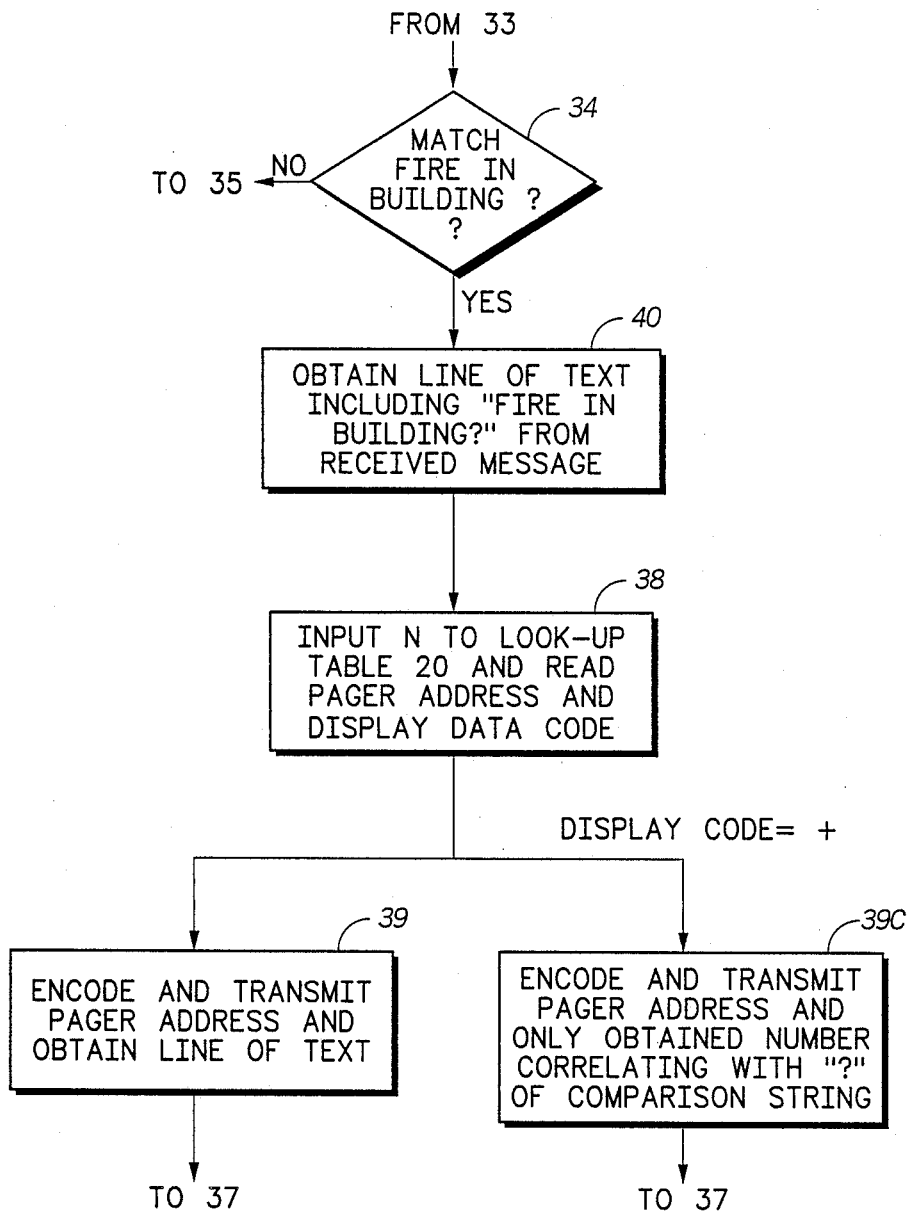

EXAMPLE 9 (refer to FIG. 8)

Triggering Text String: FIRE IN BUILDING ? (block 34)
Display Data: + (block 38)

This Display Data will send (block 39c) only the value represented by ? (Presumably a number which could be received by a numeric pager.)

EXAMPLE 10

Triggering Text String: GATE * OPEN
Display Data: GATE + OPEN

This Display Data will send the entire matching line.

Figure 9:
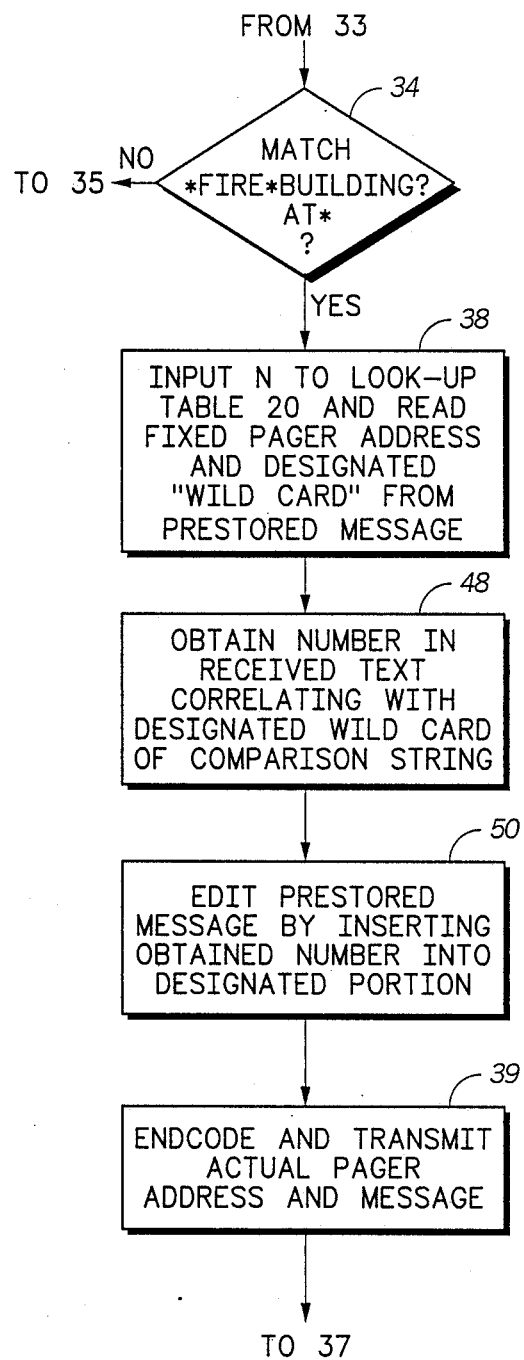

EXAMPLE 11 (refer to FIG. 9)

Triggering Text String: * FIRE * BUILDING ? AT * (block 34)
Display Data: FIRE ! GO TO BUILDING +3 (block 38).

This Display Data will send (block 39) "FIRE! GO TO BUILDING n" where n is replaced (block 50) by the character (block 48) between "BUILDING" and "AT" (the third "wild card").

A complete programming scenario is described below.

An existing alarm reporting system provides data in the following format to a single port 16 on the paging terminal 17: TIME, ALARM TYPE, LOCATION, and COMMENT.

There are three types of alarms: FIRE, INTRUSION, and POWER LOSS. LOCATION is the word "BUILDING", followed by a two-digit number from 01 to 24. COMMENT is an alphanumeric string of 0 to 40 characters.

It is desired that group pages be sent to the fire fighting team, the security team, or the electricians for the three types of alarms, respectively. These pages should include the nature of the alarm, the location, and the comment, if any. The following programming example will accomplish the desired results.

Triggering Text String: * FIRE BUILDING *
Pager Number: 2149
Display Data: FIRE! GO IMMEDIATELY TO BUILDING+2

Triggering Text String: * INTRUSION BUILDING *
Pager Number: 2471
Display Data: INTRUSION IN BUILDING+2

Triggering Text String: * POWER LOSS BUILDING *
Pager Number: 2311
Display Data: POWER FAILURE IN BUILDING +2

After being programmed as shown the message "09:47 POWER LOSS BUILDING 16 MAIN TRANSFORMER ROOM" would generate a page to pager number 2311, with the display message "POWER FAILURE IN BUILDING 16 MAIN TRANSFORMER ROOM". A non-programmed message such as "14:23 DOOR OPEN BUILDING 07 DELIVERY AREA" would not generate any page.

The feature and all associated programming is controlled by the System Operator via VDT screens and commands.

Each port may be programmed for sending up to 25 text-matching pages. Typically up to four such ports may exist on a single paging terminal.

Pages generated automatically by text-matching methods are treated the same as other pages arriving via normal inputs, as is known in the art. Priority, the number of repeats, output area, etc., are all determined the same as for any other pages. It is possible, however, to designate any or all text-matching ports to be elevated priority inputs, the same as may be done with any other inputs.

For some systems each alarm message printout may require multiple lines. For these systems it will be necessary to be able to program either the nth carriage return character, or some other character or series of characters as the end-of-message delimiter. It may be desirable to be able to program the paging terminal to automatically dial one or more telephone numbers and send an audible message. This feature may be particularly useful with the feature below.

It may be desirable to limit some or all of the text-matching programmed actions to specific time periods and/or days of the week. For example, it may be desirable to have a specific alarm message send a page during normal business hours, and dial a phone number during non-business hours.

The invention has been described with reference to condition sensor systems, but it will be appreciated that it may be applied to many other applications where it may be advantageous to monitor data for predetermined strings and make paging calls in response thereto. For example, in financial services, a system could be programmed to monitor share information services or other news information services. For example, a triggering text string might be "General Electric 50", which would cause an interested party to be paged when that stock reached a price of 50 dollars.

What is claimed is:

1. A selective call system comprising:
    means for receiving a predetermined plurality of characters;
    string searching means for monitoring said received plurality of characters including;
    means for storing a plurality of predetermined character strings, each character string of said plurality including at least one instructional character; and
    means for comparing sequentially the plurality of predetermined character strings of said storing means with said received predetermined plurality of characters to identify a predetermined character string of said plurality which correlates with the received characters;
    control means responsive tot he identified predetermined character string for selectively generating an address of a selective call receiver and message based on said identified predetermined character string and said at least one instructional character thereof; and
    transmitting means responsive to the control means for transmitting said selectively generated address and message to the selective call receiver identified by that address.

2. The selective call system of claim 1, further comprising character storage means for storing the received predetermined plurality of characters, and selector means for selecting at least one character from the stores plurality of received characters for message transmission to the selective call receiver, the at least one character selected being dependent on the instructional character of the predetermined character string identified.

3. The system of claim 2 including means for storing a plurality of operational codes; and means for selecting an operational code from said string means based on the identified character string; and wherein the selector means includes means for selecting characters from the received plurality of characters based on the selected operational code.

4. The system of claim 1, further comprising text storage means for prestoring predetermined text messages, and selector means for selecting a text message from the prestoring means based on the identified character string for transmission to the selective call receiver together with at least one character selected from the received plurality of characters based on the instructional character of the identified character string.

5. The system of claim 1, further comprising means for obtaining a numerical character from the received plurality of characters based on the identified character string and the instructional character thereof and means for calculating the address to which a message is to be sent, by combining the obtained numerical character with a fixed address.

6. The system of claim 5 wherein the identified character string includes a plurality of instructional characters; including means for designating an instructional character of the identified character string; and wherein the obtaining means includes means for obtaining the numerical character of the received plurality of characters which correlates with the designated instructional character of the identified character string.

7. The system of claim 1, further comprising means for connecting the system to one or more telephone receivers, means for dialing one or more telephone numbers and means for storing and sending an audible message to the telephone receiver so dialed.

8. A method of operating a selective call system comprising the steps of:
    receiving a predetermined plurality of characters;
    monitoring said received plurality of characters by performing string searching operations thereon including:
    storing a plurality of predetermined character strings, each character string of said plurality including at least one instructional character; and
    comparing sequentially the plurality of predetermined character strings of said storing means with said received predetermined plurality of characters to identify a predetermined character string of said plurality which correlates with the received characters;
    generating an address of a selective call receiver and message based on said identified predetermined character string and said at least one instructional character thereof; and
    transmitting the generated address and message to the selective call receiver identified by that address.

* * * * *